(12) United States Patent
Hartmann et al.

(10) Patent No.: US 9,296,392 B2
(45) Date of Patent: Mar. 29, 2016

(54) CRUISE CONTROL SYSTEM AND METHOD FOR VEHICLES

(75) Inventors: Torsten Hartmann, Munich (DE); Juergen Hartmann, Rinchnach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 539 days.

(21) Appl. No.: 13/018,843

(22) Filed: Feb. 1, 2011

(65) Prior Publication Data

US 2011/0130939 A1 Jun. 2, 2011

Related U.S. Application Data

(63) Continuation of application No. PCT/EP2009/005918, filed on Aug. 14, 2009.

(30) Foreign Application Priority Data

Aug. 23, 2008 (DE) .................. 10 2008 039 496
Dec. 10, 2008 (DE) .................. 10 2008 061 392

(51) Int. Cl.
| | |
|---|---|
| B60T 8/32 | (2006.01) |
| G05D 1/00 | (2006.01) |
| B60W 30/14 | (2006.01) |
| B60W 10/02 | (2006.01) |
| B60W 10/184 | (2012.01) |
| B60W 30/18 | (2012.01) |

(52) U.S. Cl.
CPC ............. *B60W 30/143* (2013.01); *B60W 10/02* (2013.01); *B60W 10/184* (2013.01); *B60W 30/18072* (2013.01); *B60W 2520/10* (2013.01); *B60W 2710/021* (2013.01); *B60W 2720/10* (2013.01); *Y02T 10/52* (2013.01)

(58) Field of Classification Search
USPC ............. 701/93, 110, 123; 180/170; 123/350
See application file for complete search history.

(56) References Cited

U.S. PATENT DOCUMENTS

4,590,568 A * 5/1986 Barske et al. .................. 701/93
6,076,036 A * 6/2000 Price et al. .................... 701/93

(Continued)

FOREIGN PATENT DOCUMENTS

| CN | 1882452 A | 12/2006 |
|---|---|---|
| CN | 101203670 A | 6/2008 |

(Continued)

OTHER PUBLICATIONS

Machine translation of DE102005045891.*

(Continued)

*Primary Examiner* — Bhavesh V Amin
(74) *Attorney, Agent, or Firm* — Crowell & Moring LLP (57) ABSTRACT

A vehicle cruise control system and method for consumption-oriented control of the vehicle speed within a predefined desired speed range includes an operating unit for activating the consumption-oriented speed control and a control unit, which controls the vehicle speed within the predefined desired speed range while taking into consideration a predefined maximum energy consumption value when the consumption-oriented speed control is activated. The vehicle speed is controlled in such a way that the predefined maximum energy consumption value is not exceeded only as long as a vehicle speed that lies within the predefined desired speed range is adjustable while taking into consideration the predefined energy consumption value.

17 Claims, 5 Drawing Sheets

(56) References Cited

U.S. PATENT DOCUMENTS

| | | | | |
|---|---|---|---|---|
| 6,086,511 | A * | 7/2000 | Droge | 477/121 |
| 6,122,588 | A * | 9/2000 | Shehan et al. | 701/93 |
| 6,470,256 | B1 | 10/2002 | Cikalo et al. | |
| 6,830,121 | B1 * | 12/2004 | Johnson | 180/170 |
| 6,939,265 | B2 | 9/2005 | Rustige et al. | |
| 2003/0221886 | A1 * | 12/2003 | Petrie, Jr. | 180/170 |
| 2004/0084237 | A1 | 5/2004 | Petrie, Jr. | |
| 2005/0288146 | A1 * | 12/2005 | Englisch et al. | 477/2 |
| 2007/0150166 | A1 * | 6/2007 | Mino et al. | 701/110 |
| 2008/0033624 | A1 | 2/2008 | Gronau et al. | |
| 2008/0195302 | A1 | 8/2008 | Guzman | |
| 2009/0259354 | A1 * | 10/2009 | Krupadanam et al. | 701/22 |
| 2010/0004848 | A1 * | 1/2010 | Transou, Jr. | 701/110 |
| 2010/0152990 | A1 * | 6/2010 | Bjernetun et al. | 701/93 |
| 2010/0332100 | A1 * | 12/2010 | Faggetter | 701/93 |

FOREIGN PATENT DOCUMENTS

| | | |
|---|---|---|
| DE | 102 21 701 A1 | 11/2002 |
| DE | 102 05 226 A1 | 8/2003 |
| DE | 10 2005 017 965 A1 | 10/2006 |
| DE | 10 2005 045 891 B3 | 2/2007 |
| EP | 1 334 863 A2 | 8/2003 |
| JP | 2007-276542 A | 10/2007 |

OTHER PUBLICATIONS

Machine translation of JP2007-276542 A.*

Machine translation of DE10205226 A1.*

German Search Report dated Aug. 21, 2009 including partial English translation (Nine (9) pages).

International Search Report dated Nov. 9, 2009 including English translation (Four (4) pages).

Chinese Office Action dated Mar. 18, 2013 including English-language translation. (Fifteen (15) pages).

Chinese Office Action dated Nov. 29, 2013 with English translation (five (5) pages).

\* cited by examiner

CRUISE CONTROL SYSTEM AND METHOD FOR VEHICLES

CROSS-REFERENCE TO RELATED APPLICATIONS

This application is a continuation of PCT International Application No. PCT/EP2009/005918, filed Aug. 14, 2009, which claims priority under 35 U.S.C. §119 from German Patent Application Nos. DE 10 2008 039 496.3, filed Aug. 23, 2008, and DE 10 2008 061 392.4, filed Dec. 10, 2008, the entire disclosures of which are herein expressly incorporated by reference.

BACKGROUND AND SUMMARY OF THE INVENTION

The invention relates to a cruise control system and method for vehicles of all types (for example, motor vehicles, railway vehicles, trucks, military vehicles, caterpillar-type vehicles, two wheeled vehicles, vehicles with internal combustion engines, hybrid drive systems, electric drive systems or solar drive systems etc.) for consumption-oriented control of the speed of the vehicle within a predefined desired speed range.

Vehicles with cruise control systems have existed for a long time. Most of the cruise control systems that are commercially available at the present time control the speed of the vehicle by way of a predefined desired speed. These systems are suitable predominantly for trips on roads with low traffic congestion, because in this case driving at a constant speed is often desired.

Today it is possible to obtain from some manufacturers not only these cruise control systems, but also cruise control systems that are expanded to include an inter-vehicle distance control system. In principle, the well-known cruise control system, which maintains a certain predefined desired speed, is expanded to include an additional inter-vehicle distance control function, so that the use of such an "inter-vehicle distance-dependent" cruise control system becomes possible even in congested freeway and country road traffic. This so-called "inter-vehicle distance-dependent cruise control system" maintains the predefined desired speed, when one's own lane is clear. If an inter-vehicle distance sensor system, which is mounted on the motor vehicle and which can work, in particular, based on radar, detects a target object, in particular a (motor) vehicle traveling ahead in the same lane, then one's own speed is adjusted to the speed of the motor vehicle traveling ahead by, for example, effecting a suitable braking torque. To some extent such systems can control the speed as far as up to the stationary state when the vehicle is following another vehicle.

In addition to these conventional cruise control systems, there also exist cruise control systems wherein the speed of the vehicle is not varied with respect to a predefined desired speed, but rather is varied within a predefined speed range in such a way that the result is optimal consumption. For example, DE 102 05 226 A1 discloses a device for adjusting the speed to a set desired value by automatically regulating or controlling the drive unit. In this case the desired value is assigned a range of values, in which the desired value lies. However, the system does not intervene until the speed of the vehicle is outside the range of values. If, for example, the vehicle is driving uphill, then this feature results in a rapid decrease in the speed within the range of values. That is, there is no correction. Not until the lower limit of the value range has been reached is there an acceleration. With such a design of the cruise control system it is possible to save fuel. However, since this system does not intervene until one of the two limits of the value range has been reached, on reaching the lower limit for the first time, the vehicle is maintained continuously at this speed.

DE 10 2005 017 965 A1 discloses a combination of a cruise control system for controlling the speed with respect to a predefined desired value and a fuel regulating system for regulating the fuel consumption with respect to a predefined fuel consumption value or up to a maximum fuel consumption value. In this case the fuel consumption regulation is given higher priority. If, for example, it is not possible to maintain or reach the predefined desired speed while simultaneously taking into consideration the predefined (maximum) fuel consumption value, then the cruise control system is deactivated, or another desired speed is preset. The drawback with such a system is that very soon the situation may arise that the desired speed can no longer be maintained. Then the cruise control system would be deactivated. In this situation an automatic cruise control is hardly possible or is possible for just a very short period of time. Since the fuel consumption value may not be exceeded, at each ascent the vehicle would move forward at just a very slow rate. Under some circumstances the vehicle would even stop, because the fuel consumption value cannot be maintained. This process can lead to dangerous traffic situations.

An object of the invention is to provide an improved cruise control system for consumption-oriented speed control. On the one hand, optimal fuel reduction and, on the other hand, comfortable and convenient driving become possible with this cruise control system without simultaneously constituting a traffic obstruction. Furthermore, it shall be possible to integrate this cruise control system into, for example, an inter-vehicle distance monitoring "Tempomat" (ACC [adaptive cruise control]) or into a Tempomat with brake engagement (DCC [dynamic cruise control]).

This and other objects are achieved with a cruise control system and method for vehicles in accordance with the invention. In this case the vehicle speed for consumption-oriented control is not controlled with respect to a desired speed, but rather within a predefined desired speed range. The cruise control system includes at least one operating unit for activating the consumption-oriented speed control and a control unit, which controls the vehicle speed within the predefined desired speed range by controlling the drive unit when the consumption-oriented speed control is activated. The vehicle speed is controlled as a function of the consumption-oriented speed control while simultaneously taking into consideration a predefined maximum energy consumption value such that the predefined maximum energy consumption value is not exceeded only as long as a vehicle speed that lies within the predefined desired speed range is adjustable while taking into consideration the energy consumption value. That is, within the desired speed range the energy supply for the drive unit is reduced to a maximum energy consumption value. If it is no longer possible to adjust the speed to a speed within the predefined desired speed range, then there is no need to consider the predefined energy consumption value for the purpose of speed control. That is, the speed control is given higher priority than the consideration of the predefined maximum energy consumption value.

The maximum energy consumption value (or rather the reduced energy supply) is preset, for example, as a function of a known or determined, engine-specific average consumption value—in particular, as a function of the engine-specific average consumption, as defined by the EC directive 93/116/EEC European driving cycle. Depending on the drive unit that is installed into the vehicle (for example, an internal combustion engine, electric engine, hybrid drive, solar drive, etc.), the energy consumption value involves, for example, a fuel consumption value and/or an energy consumption value, which reflects the consumption of the corresponding energy for the drive.

In a first alternative the desired speed range can be preset by the system in such a way that the result is a comfortable speed for a specific mode of driving (for example, city driving mode, country road mode or freeway mode) for the driver. For example, for the country road mode in Germany a desired speed range between 85 km/h and 100 km/h would be conceivable, and for driving on the freeway a desired speed range between 115 km/h and 135 km/h would be conceivable. A (significantly) higher upper limit of the desired speed range in the freeway driving mode is not necessarily practical, because, on the one hand, the desired speed range should not be preset too wide, and, on the other hand, the driver does not usually pay any attention to the consumption when he wants a higher speed. Regardless, it is also possible to arrange for a high speed mode. However, in practice any desired speed range is feasible.

The limits of at least one desired speed range can be configured, for example, as a function of the predefined road or region-specific speed limits that in turn can be country-specific.

Ideally the limits of the desired speed range that are set by the system can be influenced by the driver within certain limits, so that the desired range can be adjusted even better to the driver's driving style in certain driving modes. Working on this basis, it is advisable to consider the respective country-specific, legally prescribed maximum speeds and/or also minimum speeds.

This first alternative provides in an advantageous way that the consumption-oriented speed control can be activated when a corresponding operating element is actuated (for example, by holding down the Tempomat lever for a long period of time) only if at the point-in-time, at which the operating element is actuated, the current vehicle speed lies within the predefined desired speed. Otherwise, for example, the conventional Tempomat intervenes.

If, for example, a number of desired speed ranges for different driving modes are preset by the system and these ranges do not advantageously overlap, then when the corresponding operating element for the consumption-oriented speed control is actuated, the system uses the desired speed range, within which the current speed lies. If the current speed lies in none of the predefined desired speed ranges, then the consumption-oriented speed control cannot be activated. Instead, it is possible to activate in an advantageous way a conventional speed control with respect to the current speed as the desired speed or another predefined desired speed.

In a second alternative it is assumed that the vehicle is equipped, for example, with an "ECO" button, which the driver has to activate before using the consumption-oriented speed control. By activating the "ECO" button, the vehicle is practically put into the state of driving in a consumption-oriented mode. If the "ECO" button is not activated, then only the conventional Tempomat functions. The vehicle state of driving in a consumption-oriented mode can be maintained until the driver deactivates again the corresponding operating element (for example, the "ECO" button). In the following description of this second alternative it is assumed that the "ECO" button is activated and that the vehicle is in a state, in which it is driving in the consumption-oriented mode.

In this second alternative, the desired speed range (or rather the limits of the desired speed range) can be preset as a function of the current vehicle speed when the request to activate the consumption-oriented speed control is recognized (actuation of the operating element for activating). That is, the driver can activate the consumption-oriented speed control at almost any current speed, as a result of which the desired speed range is then set based on the current speed of the vehicle.

Ideally, when the operating element for activating the consumption-oriented speed control is actuated, the current vehicle speed is set as the upper limit of the desired speed range. Then a lower speed that depends on the current speed, more particularly the upper limit, is set as the lower limit of the desired speed range. The lower speed can be set, for example, in such a way that the lower limit is less than the upper limit of the desired speed range by a predefined percentage (for example, 20%) or by a predefined (speed-dependent) absolute speed value. If, for example, the operating element for activating the consumption-oriented speed control is actuated at a current vehicle speed of 100 km/h, then the upper limit of the desired speed range is set at 100 km/h, and the lower limit is set at 80 km/h (upper threshold speed minus 20%). Similarly on activation at 150 km/h the upper limit of the desired speed range is set at 150 km/h, and the lower limit is set at 120 km/h. On activation at 50 km/h the desired speed range extends from 40 km/h to 50 km/h.

The advantage of this alternative for presetting the desired speed range is that the driver can activate the consumption-oriented speed control at any speed, and the presetting of the desired speed range is intuitive to the driver. In this way the driver defines the maximum speed, at which he wants to drive from first-hand experience.

As in conventional systems, the consumption-oriented speed control can be overridden temporarily by actuating the gas pedal at any time in order to accelerate. As soon the acceleration action has been completed, the consumption-oriented speed control does not respond again until the speed of the vehicle lies in the desired speed range. The vehicle is not abruptly decelerated, but rather continues to travel until the vehicle speed lies once again in the desired speed range. In any case the consumption-oriented speed control is deactivated immediately by actuating the brake pedal.

In one configuration the speed of the vehicle is adjusted within the predefined desired speed range during the consumption-oriented speed control in such a way that the result is the maximum possible speed while simultaneously taking into consideration the maximum energy consumption value.

As an alternative to the above, an additional configuration provides that the speed of the vehicle is adjusted within the predefined desired speed range during the consumption-oriented speed control in such a way that the result is the minimum possible speed while simultaneously taking into consideration the maximum energy consumption value.

Owing to the consideration of the maximum energy consumption value during the consumption-oriented speed control, the situation may arise that the vehicle speed can no longer be maintained within the desired speed range. In order to be able to reach again or maintain the desired speed range, the cruise control system is configured in such an advantageous manner that on reaching or undershooting the lower limit of the predefined desired speed range, the control unit no longer adjusts the speed of the vehicle in consideration of the predefined maximum energy consumption value, but rather independently thereof, so that the lower limit of the desired speed range can be reached again or maintained. This approach prevents the vehicle from becoming the cause of obstructing traffic. Such operating modes typically occur when traveling uphill. Especially in this case it is possible to set, independently of the energy consumption value, a vehicle speed that corresponds to at least the lower limit of the desired speed range, or is greater than said lower limit.

If the lower limit of the desired speed range can be adjusted again or at least maintained presumably even while taking into consideration the predefined maximum energy consumption value, then the speed control is executed again while taking into consideration the predefined maximum energy consumption value. Working on this basis, it is advantageous if the speed control, which is independent of the energy consumption value, is active only until a predefined first minimum speed within the desired speed range is reached, or until the predefined first minimum speed is reached and is maintained for a predefined first time interval by applying an energy consumption value that is at least no greater than the predefined maximum energy consumption value. The predefined first minimum speed value can be, for example, the lower limit of the desired speed range or greater than this lower limit.

In order to be able to save even more energy, it is possible in the case of vehicles with an automatically operable clutch to interrupt, on detecting a hill descent, the force closure between the drive unit and the transmission unit and/or the drivable wheels by opening the clutch, and the energy supply for the drive unit can be reduced so as to go to zero. According to a first alternative, this interruption of the force closure and the reduction in the energy supply can be executed, if a boost mode is present (that is, the energy consumption value goes to zero) and the vehicle speed within the desired speed range remains constant or rises. If this state is recognized by the control unit or is indicated by means of a respective signal, then the control unit sends out a force closure interrupt signal for interrupting the force closure between the drive unit and the transmission unit and/or the drivable wheels of the vehicle.

As an alternative, the control unit does not send out a force closure interrupt signal for interrupting the force closure between the drive unit and the transmission unit and/or the drivable wheels of the vehicle until the upper limit of the desired speed range is reached or exceeded. The strategy ensures that only after a suitable supply of energy does the vehicle reach as fast as possible the upper limit of the desired speed range, and only after the speed continues to increase nevertheless, (for example, owing to the boost mode) does the clutch open. A minimal overshooting of the upper limit of the desired speed range can occur, for example, due to the boost mode, because no automatic brake engagement takes place within the desired speed range during the consumption-oriented speed control.

In order to be able to hold or reach the predefined desired speed range, the brake engagement (in both alternatives) is initiated, so that the result is the maximum allowable vehicle speed that corresponds to the upper limit of the desired speed range.

If, in the event that the clutch is opened, a predefined second minimum speed is reached within the desired speed range without brake engagement or is maintained without brake engagement (that is, the downhill force is no longer present and the vehicle speed decreases), then the control unit sends out a force closure closing signal to restore the force closure between the drive unit and the transmission unit and/or the drivable wheels. Then the force closure is restored, and the speed control is performed again while simultaneously taking into consideration the predefined maximum energy consumption value in such a way that this maximum energy consumption value is not exceeded. The upper limit of the desired speed range or the lower limit of the desired speed range or any speed within the desired speed range can be preset as the second minimum speed.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
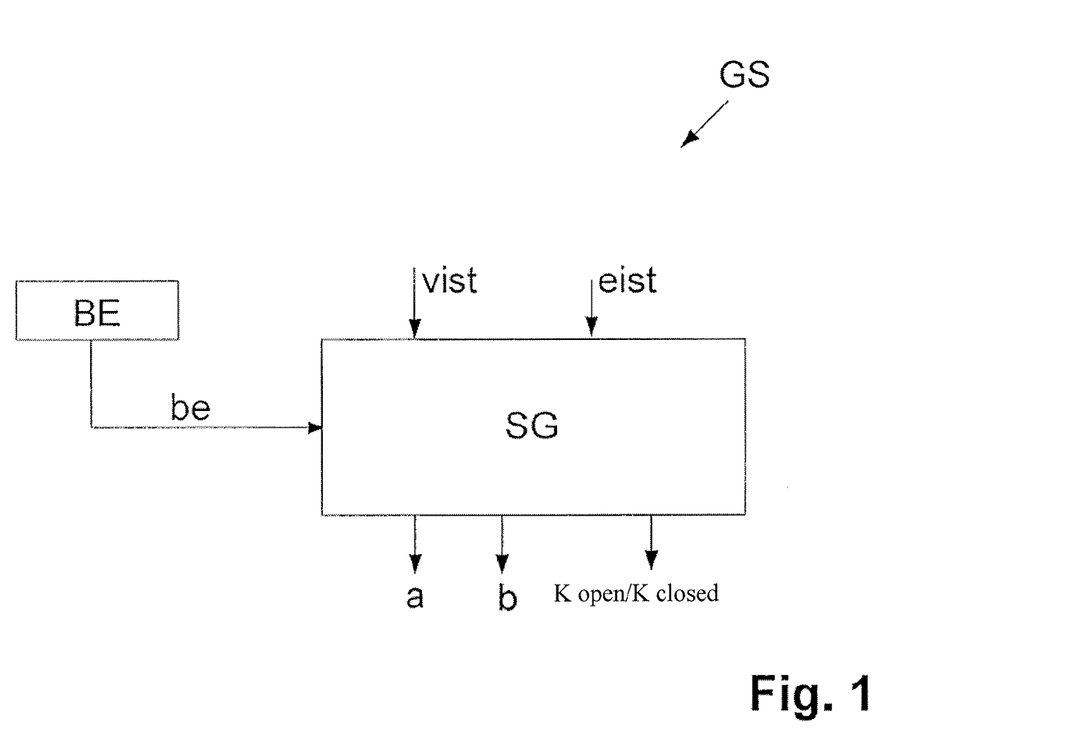
FIG. 1 illustrates a cruise control system for the consumption-oriented speed control of the speed of the vehicle.

FIG. 1 shows a cruise control system GS for vehicles for consumption-oriented speed control with a predefined desired speed range. The system GS includes an operating element BE for activating the consumption-oriented speed control and a control unit SG, which controls the vehicle speed within the predefined desired speed range while simultaneously taking into consideration a predefined maximum energy consumption value when the consumption-oriented speed control is activated. The operating element BE can be, for example, a lever or a switch arrangement, as known from conventional cruise control systems. If the operating element BE is actuated in the specified way, then the control unit SG is sent a corresponding actuating signal, which indicates to the control unit SG that the driver wants the consumption-optimized speed control to be activated.

In addition to the actuating signal be, the control unit SG also receives a plurality of additional signals, which are necessary for the consumption-oriented speed control. For example, the control unit SG receives a signal regarding the current vehicle speed vist and a signal regarding the current energy consumption value eist. Similarly it is possible (but not illustrated herein) that the control unit SG receives the limits of the at least one predefined desired speed range, said limits having been automatically changed or changed by the driver. These limits can also be stored in a memory unit in the control unit.

In order to be able to adjust the speed of the vehicle while taking into consideration the predefined maximum energy consumption value, the control unit sends out at least one drive signal a to an actuating unit for demand-based actuation of the drive unit, and a braking signal b to a brake system for demand-based actuation of the brake system. In principle, a braking signal b is sent out only if it is necessary to maintain or reach the upper limit of the desired speed range. Otherwise there is no brake engagement. If the vehicle, of which the speed is to be adjusted in a consumption-oriented manner, involves a vehicle having an automatically operable clutch for interrupting the power transmission from the drive unit to the driven wheels, then the control unit is designed to send a force closure interrupt signal "K open" and a force closure closing signal "K closed" to a unit that can actuate the clutch.

Figure 2:
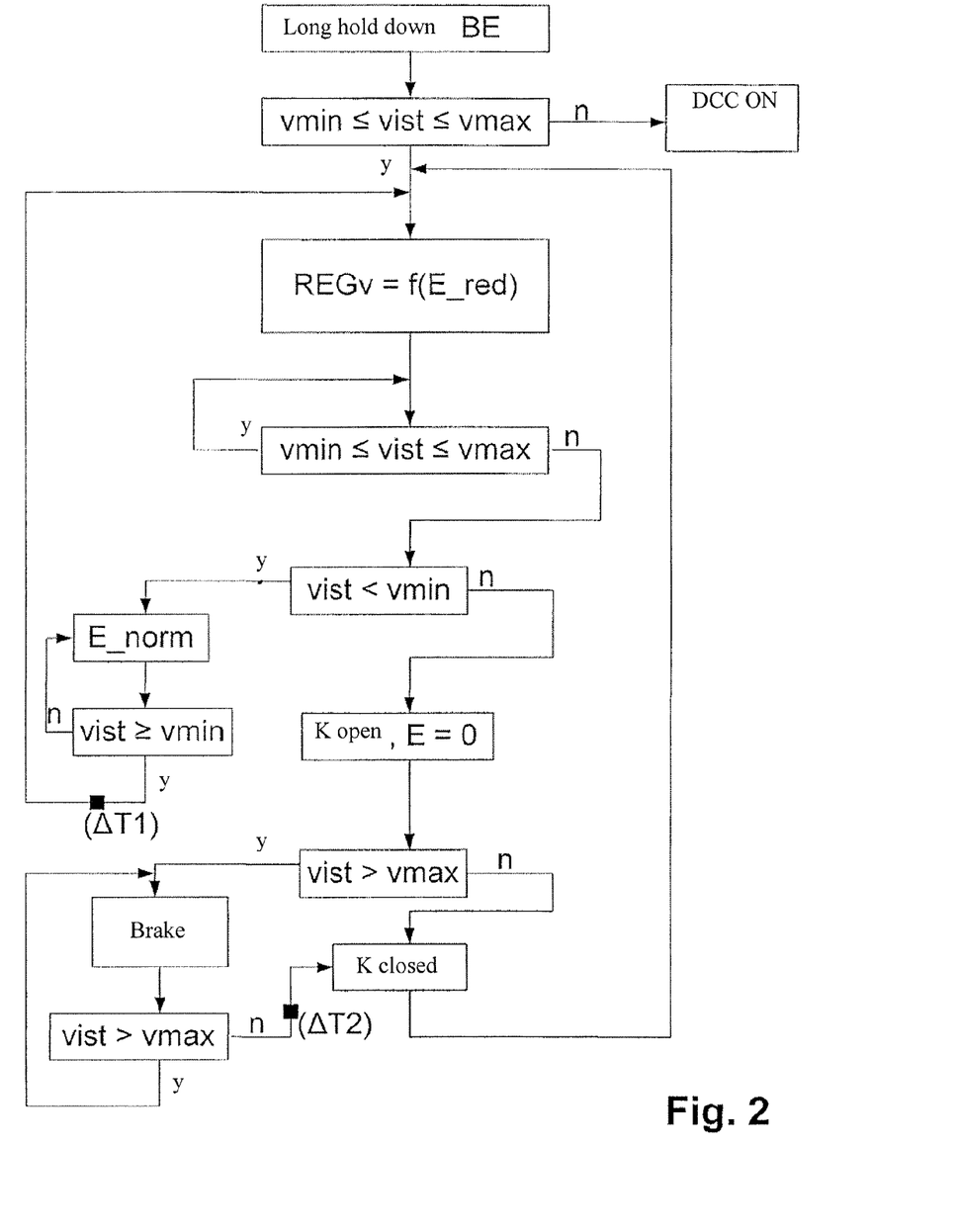
FIG. 2 is a first flowchart for depicting a first inventive embodiment of a consumption-oriented speed control.
Figure 3:
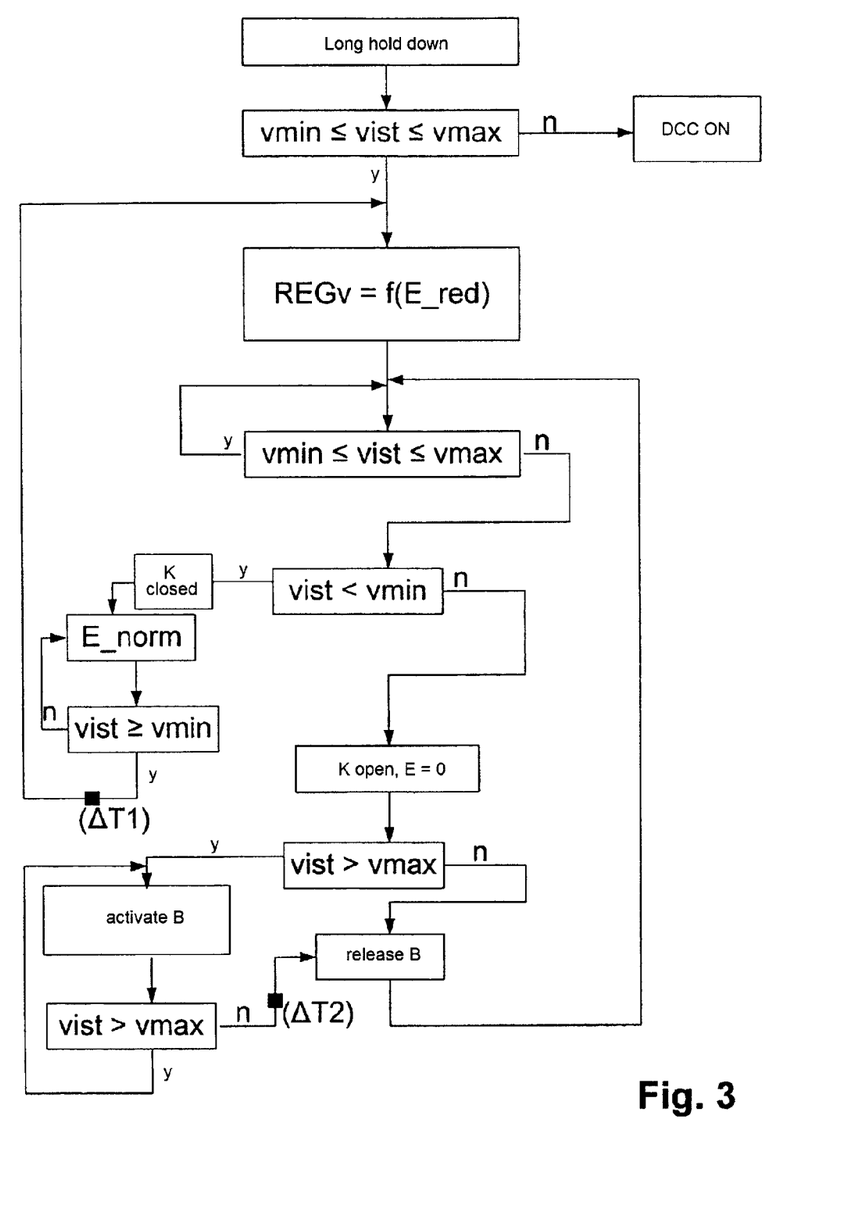
FIG. 3 is a second flowchart for depicting a second inventive embodiment of a consumption-oriented speed control.

At this point the next two figures—FIG. 2 and FIG. 3—are highly simplified drawings of two different alternatives of the cruise control system for consumption-oriented speed control within a predefined desired speed range. In principle, the consumption-oriented speed control in the two alternatives can be actuated by holding down an existing Tempomat lever BE for a fairly long time in a defined direction, can be overridden by actuating the gas pedal (as described above), and can be deactivated by operating the brake pedal. Moreover, for the consumption-oriented speed control the system has a desired speed range for the country driving mode, which is defined by a lower limit vmin of 85 km/h and an upper limit vmax of 100 km/h. In addition, there could also be a second desired speed range for the freeway driving mode between 115 km/h and 135 km/h which, however, is not considered in these examples.

Both flowcharts check at the start whether the existing operating element BE for activating the consumption-oriented speed control was actuated in the specified manner. If the Tempomat lever BE is held down for a suitably long period of time, then the next step checks whether the current speed vist lies within the predefined desired speed range that is defined by the lower limit vmin and the upper limit vmax.

If the current vehicle speed vist does not lie between the lower limit vmin and the upper limit vmax, then, instead of the consumption-oriented speed control, a conventional speed control DCC (which exists in the vehicle) with respect to the current vehicle speed as the desired speed is activated. If, however, the current vehicle speed vist lies between the lower limit vmin and the upper limit vmax, then the consumption-oriented speed control REGv is activated. At the same time, the control of the speed within the defined desired speed range between vmin and vmax is performed while simultaneously taking into consideration a predefined maximum energy consumption value E_red (in this example it involves a fuel consumption value) in such a way that the predefined maximum energy consumption E_red is not exceeded as long as a vehicle speed that lies within the predefined desired speed range between vmin and vmax is adjustable by suitably actuating the drive unit while simultaneously taking into consideration this energy consumption value E_red. As a result, the maximum energy supply for the drive unit is reduced to a maximum energy consumption value that lies, for examples, 60% below the engine-specific average consumption value of this drive unit and/or this engine.

This consumption-oriented speed control REGv is executed only as long as the current vehicle speed vist lies within the desired speed range between vmin and vmax. If it is determined that the current vehicle speed vist no longer lies within the desired speed range between vmin and vmax, then the next step queries whether the current vehicle speed vist is less than the lower limit vmin of the desired speed range. This can occur, for example, while driving up a hill, because then the maximum energy consumption value is inadequate for maintaining the speed within the predefined desired speed range between vmin and vmax. If this is the case, then in order to reach the lower limit vmin of the desired speed range, the energy consumption limit is eliminated, and then the speed control is performed with an unlimited energy consumption value E_norm. This consumption-independent speed control is executed until the lower limit vmin of the desired speed range is reached again, and, if desired, a predefined time interval $\Delta T1$ has expired. In this time interval the energy consumption value for the purpose of at least maintaining the lower limit vmin of the desired speed range is not greater than the predefined maximum energy consumption value E_red. Instead of the lower limit vmin, it is also possible to use a different minimum speed within the desired speed range between vmin and vmax as the limit speed for switching over from the consumption-independent speed control with a required energy consumption value E_norm into the consumption-oriented speed control REGv while simultaneously taking into consideration the predefined maximum reduced energy consumption value E_red.

If it is determined that the current vehicle speed vist no longer lies within the desired speed range between vmin and vmax and the current vehicle speed vist is not less than the lower limit vmin of the desired speed range, then it is greater than or equal to the upper limit vmax of the desired speed range. Since this case may occur, when the vehicle speed increases owing to, for example, an existing gradient or, for example, a strong tail wind, since no automatic brake engagement is carried out during the consumption-oriented speed control between vmin and vmax, it is assumed that the vehicle is in boost mode. Then the control unit sends a force closure interrupt signal K open to a clutch control unit, which then opens the clutch and interrupts the force closure between the drive unit and the drivable wheels. Then the energy supply for the drive unit is reduced towards zero (or maintained there, because it goes to zero anyway during the boost mode of the vehicle), because owing to the interrupted force closure a drive is impossible in any case and also not practical. Finally it is queried (once more) whether the current vehicle speed vist is still greater than the upper speed limit vmax.

If this is the case, then an automatic brake engagement B is initiated, if possible with energy recovery, as shown in the embodiment in FIG. 3. The brake engagement B is executed until at least the upper limit vmax of the predefined desired speed range has been reached again, and—analogous to the above—optionally a predefined second time interval $\Delta T2$ has expired, within which no brake engagement for reaching or holding the upper limit vmax of the desired speed range is executed. If the preceding condition has been met, then the clutch is closed again, and once again a consumption-oriented speed control REGv takes place while simultaneously taking into consideration the predefined maximum reduced energy consumption value E_red.

Instead of the upper limit vmax, it is also possible to use another second minimum speed within the desired speed range between vmin and vmax as the limit speed for switching over into the consumption-oriented speed control REGv while simultaneously taking into consideration the predefined maximum reduced energy consumption value E_red. Such an example is shown in FIG. 3. In this case the automatic brake engagement is also cancelled, if the upper limit vmax is reached, but the clutch is not closed until the lower limit vmin of the desired speed range is undershot. In this way the kinetic and potential energy of the vehicle (or other energy effects on the vehicle) is still exhausted until the lower limit vmin is reached.

Figure 4:
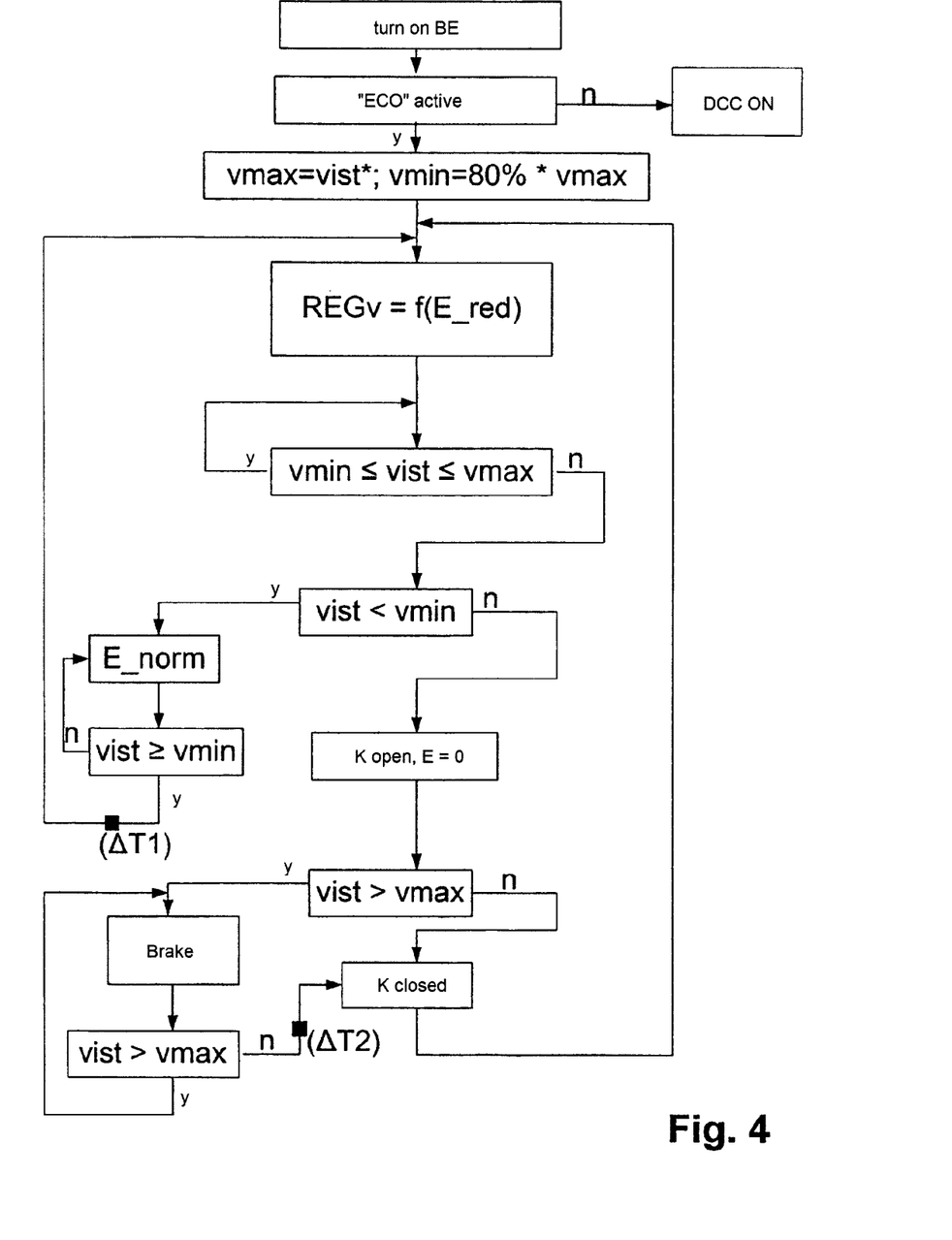
FIG. 4 is a third flowchart for depicting a third inventive embodiment of a consumption-oriented speed control.
Figure 5:
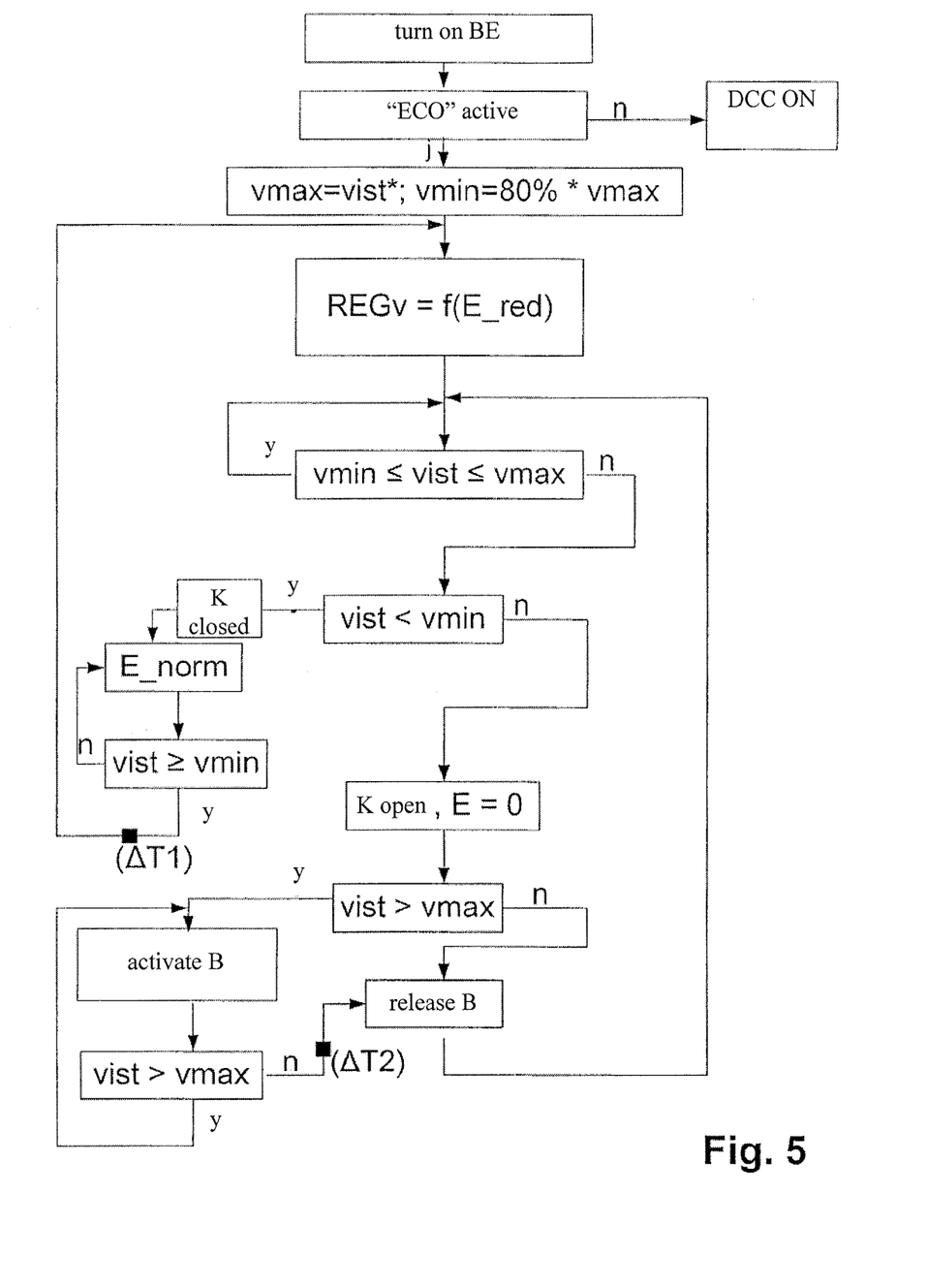
FIG. 5 is a fourth flowchart for depicting a fourth inventive embodiment of a consumption-oriented speed control.

As an alternative to the two flowcharts described in FIGS. 2 and 3, it is possible to preset the desired speed range, as additionally depicted in FIG. 4 and FIG. 5, as a function of the current speed when the consumption-oriented speed control is activated. In this case the current speed is ideally preset as the upper limit of the desired speed range, and a speed that is less than the current speed by a predefined percentage (for example 20%) is preset as the lower limit.

Both FIGS. 4 and 5 show that when the operating element BE for activating the consumption-oriented speed control is actuated, it is checked whether the vehicle is in a consumption-oriented mode. That is, it is checked whether "ECO" is active. This consumption-oriented mode can be activated by the driver, for example, by means of an ECO button. Only if the ECO mode is active can the consumption-oriented speed control be started. If this mode is active, then in the next step the desired speed range for the consumption-oriented speed control is specified. The upper limit vmax is defined as the current speed Vist* at the point-in-time, at which the operating element BE is actuated, and the lower limit vmin is defined as, for example, 80% of the upper limit vmax. After the desired speed range has been defined, the routine runs in FIG. 4 in a manner analogous to the sequence (depicted in FIG. 2) for the consumption-oriented speed control, and in FIG. 5, analogous to the sequence (depicted in FIG. 3) for the consumption-oriented speed control.

If, however, the vehicle is not in a so-called ECO mode when the operating element BE for activating the consumption-oriented speed control is activated, then a conventional speed control DCC with respect to the current speed is activated, instead of the consumption-oriented speed control.

Thus, the cruise control system according to the invention offers the advantage of a consumption-optimized speed control within the predefined desired speed range. If the vehicle slows down because it is traveling uphill, then the consumption-oriented speed control is interrupted until a speed within the desired speed range with reduced energy consumption is possible again. If the speed increases, for example, because of a gradient, above the predefined upper limit of the desired speed range, then the force closure between the drive unit and the drivable wheels is interrupted, and the energy supply is turned off, because no fuel (or rather energy) is needed to maintain the speed. If desired, a brake engagement (if present with energy recovery) is executed until the upper limit of the desired speed range is reached.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle cruise control system for consumption-oriented control of a vehicle speed within a predefined desired speed range, the system comprising:
   an operating element for activating consumption-oriented speed control;
   a control unit operatively coupled with the operating element, the control unit controlling the vehicle speed within the predefined desired speed range while taking into consideration a predefined maximum allowed energy consumption rate value when the consumption-oriented speed control is activated;
   wherein the control unit is operatively configured such that an actual energy consumption rate value when the vehicle speed is within the predefined speed range does not exceed the predefined maximum allowed energy consumption rate value only as long as the vehicle speed is maintainable within the predefined desired speed range without exceeding the predefined energy consumption rate value.

2. The vehicle cruise control system according to claim 1, wherein the predefined maximum allowed energy consumption rate value is less than a predefined or determined engine-specific average energy consumption rate value.

3. The vehicle cruise control system according to claim 1, wherein on reaching or undershooting a lower limit of the predefined desired speed range, the vehicle speed is adjustable, independently of the predefined maximum allowed energy consumption rate value, to a vehicle speed greater than or equal to the lower limit of the predefined desired speed range.

4. The vehicle cruise control system according to claim 3, wherein a vehicle speed control independent of the predefined maximum allowed energy consumption rate value is active until a predefined first minimum speed is reached, or until a predefined first minimum speed is reached and maintained for a predefined first time interval with an energy consumption rate value at least not greater than the predefined maximum allowed energy consumption rate value.

5. The vehicle cruise control system according to claim 1, wherein upon reaching or exceeding an upper limit of the desired speed range, the control unit issues a force closure interrupt signal in order to interrupt a force closure between the drive unit and drivable wheels of the vehicle.

6. The vehicle cruise control system according to claim 5, wherein upon reaching or undershooting a predefined second minimum speed within the desired speed range, the control unit issues a force closure closing signal in order to restore the force closure between the drive unit and the drivable wheels of the vehicle.

7. The vehicle cruise control system according to claim 1, wherein upon exceeding an upper limit of the desired speed range, the control unit issues a braking signal to initiate brake engagement.

8. The vehicle cruise control system according to claim 1, wherein the control unit is operatively configured such that when the operating element is actuated, the consumption-oriented speed control for controlling the vehicle speed within the predefined desired speed range is activatable only if a current vehicle speed lies within the predefined desired speed range.

9. The vehicle cruise control system according to claim 1, wherein said predefined desired speed range comprises at least two alternative predefined desired speed ranges and which one of the two alternative predefined speed range to be used as said predefined desired speed range is determined as a function of an operating condition of the vehicle.

10. The vehicle cruise control system according to claim 9, wherein the control unit is operatively configured such that when the operating element is actuated, speed control for controlling the vehicle speed is activated for a desired speed range in which the current vehicle speed lies.

11. The vehicle cruise control system according to claim 1, wherein the control unit is operatively configured such that when the operating element for activating speed control is actuated, the current vehicle speed is set as an upper limit of the desired speed range and a lower speed that is a predefined function of the current vehicle speed is set as a lower limit of the desired speed range.

12. The vehicle cruise control system according to claim 1, wherein the control unit is operatively configured such that when the operating element for activating the consumption-oriented speed control is actuated, said consumption-oriented speed control is only activated if the vehicle is in a mode in which activation of consumption-oriented speed control is desirable.

13. A method of operating a vehicle cruise control system for consumption-oriented control of vehicle speed within a predefined desired speed range, the method comprising the acts of:
   receiving an activation signal from an operating unit for activating the consumption-oriented speed control;
   receiving a signal indicative of a vehicle speed at a control unit; and
   controlling the vehicle speed with the control unit within the predefined desired speed range based upon a predefined maximum energy consumption rate value such that an actual energy consumption rate value when the vehicle speed is within the predefined speed range does not exceed the predefined maximum allowed energy consumption rate value only as long as the vehicle speed is maintainable within the predefined desired range without exceeding the predefined maximum energy consumption rate value.

14. The method according to claim 13, wherein the predefined maximum allowed energy consumption rate value is less than a predefined or determined engine-specific average energy consumption rate value.

15. The method according to claim 13, further comprising the act of:
   upon reaching or undershooting a lower limit of the predefined desired speed range, adjusting the vehicle speed independently of the predefined maximum allowed energy consumption rate value to a vehicle speed greater than or equal to the lower limit of the predefined desired speed range.

16. The method according to claim 15, wherein the adjusting act is carried out until one of: (a) a predefined first minimum speed is reached, and (b) a predefined first minimum speed is reached and maintained for a predefined time interval.

17. The method according to claim 13, further comprising the act of:
   upon reaching or exceeding an upper limit of the desired speed range, issuing a force closure interrupt signal to interrupt a force closure between a drive unit and drivable wheels of the vehicle.

* * * * *